US008389285B2

(12) United States Patent
Carpenter et al.

(10) Patent No.: US 8,389,285 B2
(45) Date of Patent: Mar. 5, 2013

(54) PREPARATION AND OPTIMIZATION OF OXYGENATED GASOLINES

(75) Inventors: David W. Carpenter, Saint Charles, MO (US); David S. Seiver, Houston, TX (US); James W. Holbert, Maryville, IL (US); Yi-Ming Chen, Houston, TX (US); Christopher J. LaFrancois, Bartlesville, OK (US)

(73) Assignee: Philips 66 Company, Houston, TX (US)

( * ) Notice: Subject to any disclaimer, the term of this patent is extended or adjusted under 35 U.S.C. 154(b) by 0 days.

(21) Appl. No.: 13/541,253

(22) Filed: Jul. 3, 2012

(65) Prior Publication Data

US 2012/0271614 A1 Oct. 25, 2012

Related U.S. Application Data

(63) Continuation of application No. 12/277,454, filed on Nov. 25, 2008, now Pat. No. 8,236,566.

(51) Int. Cl.
*G06F 17/10* (2006.01)
*G06F 17/00* (2006.01)

(52) U.S. Cl. .............................................. 436/60; 703/2

(58) Field of Classification Search .................... 436/60; 703/2
See application file for complete search history.

(56) References Cited

U.S. PATENT DOCUMENTS 6,258,987 B1 * 7/2001 Schmidt et al. .................. 585/3

OTHER PUBLICATIONS

State of California, California Environmental Protection Agency, Air Resources Board, "Procedures for Using the California Model for California Reformulated Gasoline Blendstocks for Oxygenate Blending (CARBOB)", Adopted: Apr. 25, 2001, Amended: Aug. 7, 2008, 14 pages.

* cited by examiner

*Primary Examiner* — Christine T Mui
(74) *Attorney, Agent, or Firm* — Phillips 66 Company

(57) ABSTRACT

A process for controlling the composition of an xBOB so that the xBOB will yield an oxygenate-containing gasoline which precisely meets desired specifications when mixed with the desired amount of oxygenate. The process involves blending a plurality of blendstocks to produce an xBOB, withdrawing a sample of the xBOB, obtaining spectroscopic measurements for the sample, applying mathematical models that were based on correlation of xBOB spectra to associated oxygenate-containing gasoline properties, to predict laboratory analysis results for oxygenate-containing gasoline properties, and using the analysis results to control and optimize the blending process.

10 Claims, 1 Drawing Sheet

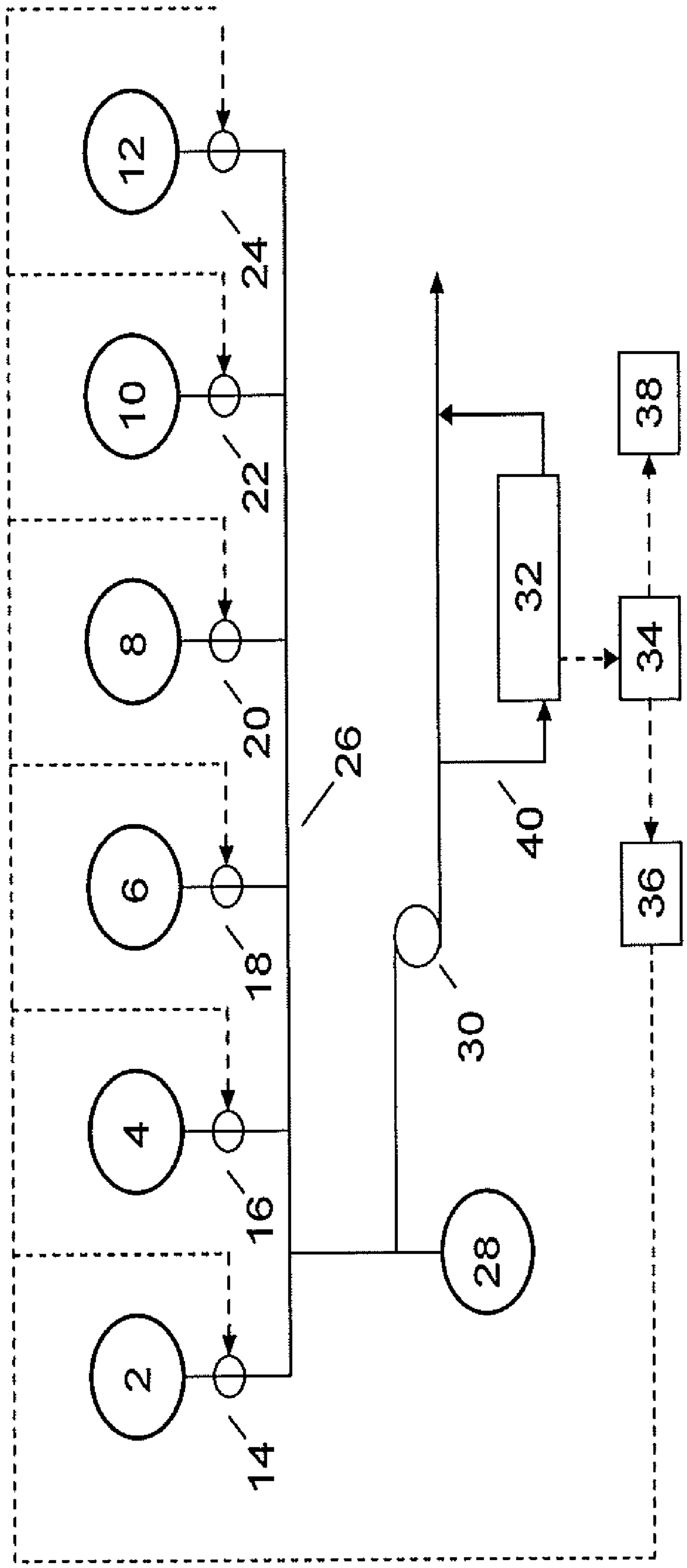
12
24
10
22
8
20
26
6
18
4
16
2
14
28
30
40
32
34
36
38

PREPARATION AND OPTIMIZATION OF OXYGENATED GASOLINES

CROSS-REFERENCE TO RELATED APPLICATION

This application is a continuation application which claims the benefit of and priority to U.S. application Ser. No. 12/277,454. filed Nov. 25, 2008, entitled "Preparation and Optimization of Oxygenated Gasolines", which is hereby incorporated by reference in its entirety.

BACKGROUND OF THE INVENTION

1. Field of the Invention

This invention relates to the preparation of oxygenate-containing finished gasoline, wherein the finished gasoline is manufactured by mixing an oxygenate-free substantially hydrocarbon blend, also herein referred to as "xBOB", with a known, constant quantity and constant composition of one or more oxygenates. More particularly, the invention provides an improved blend control process for xBOB manufacture to maintain pre-determined properties of the oxygenate-containing finished gasoline from such a process.

2. Description of the Prior Art

Gasoline is comprised of a complex mixture of volatile hydrocarbons which are suitable for use as a fuel in a spark-ignition internal combustion engine, and it typically boils over a temperature range of about 80° to about 437° F. Although gasoline can consist of a single blendstock, such as the product from a refinery alkylation unit, it is usually comprised of a blend of several blendstocks. The blending of gasoline is a complex process, which typically involves the combination of from as few as three or four to as many as twelve or more different blendstocks to meet regulatory requirements and such other specifications as the manufacturer may select. Optimization of this blending process must take into account a plurality of characteristics of both the blendstocks and the resulting gasoline. Among others, such characteristics can include cost and various measurements of volatility, octane, boiling point characteristics, and chemical composition.

It is conventional practice in the industry to blend gasoline using blendstock ratios which are determined by mathematical algorithms also known as blending equations. Such blending equations are well known in the refining industry, and are either developed or tailored by each refiner and refinery for use in connection with available blendstocks. Blending equations typically relate the properties of a gasoline blend to the quantity of each blendstock in the blend and also to either the measured or anticipated properties of each blendstock in the blend.

Although hydrocarbons usually represent a major component of gasoline, it has been found that certain oxygen containing organic compounds can be advantageously included as gasoline components. These oxygen containing organic compounds are referred to as "oxygenate" or "oxygenates," and are useful as components in gasoline because they are usually of high octane and can be a more economical source of gasoline octane than a high octane hydrocarbon blending component such as alkylate or reformate. As used herein, the term "oxygenate" includes both the singular "oxygenate" and the plural "oxygenates." Current government regulations in the U.S. limits the oxygen content of gasoline to about 3.8. weight percent, based on elemental oxygen, and also requires that reformulated gasolines contain at least 1.5. weight percent of oxygenate or 10. volume percent denatured fuel ethanol, as in accordance with ASTM D4806-08b or the most current ASTM version. Oxygenates which have received substantial attention as gasoline blending agents include, but are not limited to, methanol, ethanol, tertiary-butyl alcohol, methyl tertiary-butyl ether, ethyl tertiary-butyl ether, and methyl tertiary-amyl ether. However, ethanol has become one of the most widely used oxygenates.

Oxygenate, if desired, usually is not blended into a gasoline at or within a refinery because oxygenates can be water soluble. As a consequence of this water solubility, an oxygenate-containing gasoline can undergo undesirable changes if an oxygenate-containing gasoline comes in contact with water during transport through any portion of a distribution system, which may include pipelines, stationary storage tanks, rail cars, tanker trucks, barges, ships and the like. For example, an oxygenate-containing gasoline can absorb or dissolve water which will then be present as an undesirable contaminant in the gasoline. Alternatively, water can extract oxygenate from the gasoline, thereby changing the chemical composition of the gasoline and negatively affecting the specifications of the gasoline. In order to avoid, as much as possible, any adverse effects from water, oxygenate-containing finished gasoline usually is manufactured by a multi-step process wherein the oxygenate is incorporated into the gasoline at a point which is near the end of the distribution system.

More specifically, gasoline which contains oxygenates generally is manufactured by producing an unfinished and substantially hydrocarbon blendstock, xBOB, at a refinery, transporting the xBOB to a product terminal in the geographic area where the finished gasoline is to be distributed, and mixing the xBOB with the desired amount of oxygenate at the product terminal. The combination of the xBOB with an oxygenate yields an oxygenate-containing finished gasoline which meets all regulations and specifications for sale.

As used herein, the substantially hydrocarbon blendstock, can be, and usually is, called an "xBOB" (Blendstock for Oxygenate Blending) when the blendstock is destined to be combined with a predetermined quantity and quality oxygenate to produce finished gasoline. xBOB is not a consistent blend and can vary with refinery or blending operations Examples of xBOB include, but are not limited to RBOB (reformulated blendstock for oxygenate blending), CBOB (conventional reformulated blendstock for oxygenate blending), CARBOB (California reformulated blendstock for oxygenate blending), Chicago BOB (Chicago RBOB or Chicago reformulated blendstock for oxygenate blending), Arizona RBOB, and Albuquerque RBOB. There can be a variety of other names for "BOB" gasolines.

Oxygenate-free finished gasoline can be manufactured within a refinery to very precisely fit the final US government specifications because analytical data for the product can be used to control the blending process. As a consequence, manufacturing costs are kept to a minimum by minimizing the amount of more costly refinery blendstocks in the blend.

When an xBOB is manufactured at a refinery, the xBOB properties are typically measured and controlled to meet intermediate specifications that differ from the finished gasoline. The intermediate specifications are developed to ensure that xBOB produced with a relatively wide range of compositions will always meet finished gasoline specifications after it is mixed with a predetermined quantity and quality oxygenate. As a result of targeting intermediate specifications, the xBOB and oxygenate mixture on average exceed the finished gasoline specifications. For example, an advanced closed loop feedback control system that is able to produce an xBOB to meet an intermediate octane target to within 0.01. octane points will often yield a finished octane after addition of ethanol that varies from 0.1. to 0.4. octane points above the minimum finished gasoline specification. Producing xBOB with lower precision in the meeting finished gasoline specifications after mixing the xBOB with oxygenate requires a more expensive average refinery blendstock and increases manufacturing costs.

SUMMARY OF THE INVENTION

Most oxygenate-containing finished gasoline is manufactured by a two step process which comprises manufacturing an oxygenate-free substantially hydrocarbon blend, or xBOB, in a refinery, transporting the xBOB to a product terminal in the geographic area where the oxygenate-containing finished gasoline is to be distributed, and preparing the oxygenate-containing finished gasoline at the product terminal by mixing the xBOB with a predetermined quality and quantity of oxygenate. The octane, volatility, and other properties of the resulting mixture are dependent not only on the xBOB to oxygenate ratio, but on the composition of the xBOB. As a result, it is difficult to produce an oxygenate-containing finished gasoline by this multi-step procedure which has the precise octane, volatility, and other desired properties to meet finished gasoline specifications.

We have determined that the composition of an xBOB can be controlled to yield an oxygenate-containing finished gasoline which precisely meets desired specifications when mixed with a known, constant quantity and constant composition of oxygenate by a modification of the blending process that is used to produce an xBOB. The modification involves use of chemometric models that predict the oxygenate-containing finished gasoline properties from spectroscopic data for the xBOB. These models can be applied via on-line spectroscopic analysis of a product stream for continuous property monitoring. A closed-loop control system makes necessary adjustments to automatically blend the components in order to maintain oxygenate-containing finished gasoline properties based on model predictions. The models are developed through a process which involves withdrawing a sample of the xBOB, acquisition of spectroscopic data, mixing the xBOB with a known quality and quantity of oxygenate, determining one or more physical properties of the mixture using standard laboratory methods, and using the analysis result for a series of xBOB stream samples to create a model that correlates spectroscopic data for the xBOB stream to the laboratory results for the oxygenate-containing finished gasoline.

One embodiment of the invention is a process for preparing an xBOB which can be converted to an oxygenate-containing finished gasoline of desired specifications by mixing the xBOB with a constant quantity and quality of oxygenate, wherein a plurality of blendstocks are mixed to yield the xBOB, and wherein said process comprises: (a) using chemometric models to predict the oxygenate-containing finished gasoline properties from spectroscopic data for the xBOB; (b) applying said chemometric models to an xBOB product stream using either on-line or off-line spectroscopic analysis to continuously monitor the gasoline properties, (c) using either a manual control system or a closed loop control system to automatically adjust the ratio of blendstock streams to maintain oxygenate-containing finished gasoline properties based on model predictions.

Another embodiment of the invention comprises a process for preparing a calibration model for the prediction of properties for an oxygenate-containing finished gasoline of desired specifications from spectroscopic data for an xBOB wherein the process comprises:

(a) collecting an xBOB stream sample;
(b) analyzing the xBOB stream sample by one or more spectroscopic methods to produce an analyzed xBOB product spectrum;
(c) transmitting the spectrum of the analyzed xBOB product to a conversion device to mathematically correct or enhance the spectrum to create a corrected spectrum;
(d) adding a fixed, known quantity of a pre-determined oxygenate composition to said analyzed xBOB product to produce an associated oxygenate-containing gasoline;
(e) performing laboratory tests on said associated oxygenate-containing gasoline to determine laboratory results for one or more chemical or physical properties; and
(f) correlating the spectra from a series of xBOB streams to the laboratory results for the associated oxygenate-containing gasoline products to produce a calibration model. Another embodiment of the invention further comprises the additional step of:
  (h) transmitting the predicted results from the model to a control system, wherein said control system can modify the ratio of blendstocks in the xBOB stream to produce an xBOB stream that when combined with a fixed, known quantity of a pre-determined oxygenate composition will produce an associated oxygenate-containing finished gasoline.

BRIEF DESCRIPTION OF THE DRAWING

The drawing, FIG. 1, is a schematic representation of a gasoline blending system utilizing one embodiment of the present invention.

DETAILED DESCRIPTION

As used herein, the term “finished gasoline” refers to a gasoline product that meets all required regulations and specifications. However, “finished gasoline” may not contain federally mandated required additives, such as detergents; “finished gasoline” can be used as fuel for retail use. The term “oxygenate-containing finished gasoline” refers to gasoline products containing one or more oxygenates that meets all required regulations. Again, “oxygenate-containing finished gasoline” may not contain federally mandated required additives, such as detergents; “oxygenate-containing finished gasoline” can be used as fuel for retail use.

Any oxygenate or mixture of oxygenates can be used in the practice of this invention. However, monohydric aliphatic alcohols are usually most typical of oxygenates which are currently employed commercially in the manufacture of oxygenate-containing finished gasoline. Alcohols which contain from 1. to about 10. carbon atoms can be conveniently used. Desirable alcohols will contain from 1. to 5. carbon atoms, and preferred alcohols will contain from 1. to 4. carbon atoms. For example, the alcohol of oxygenate-containing finished gasolines of this invention can be comprised of at least one compound which is selected from the group consisting of methanol, ethanol, 1-propanol, 2-propanol, 1-butanol, 2-butanol, 2-methyl-1-propanol, 2-methyl-2-propanol, 1-pentanol, 2-pentanol, 2-methyl-1-butanol, 3-methyl-1-butanol, 2-methyl-2-butanol, 3-methyl-2-butanol and mixtures thereof. Methanol and ethanol are highly satisfactory alcohols for use in the practice of this invention.

In the practice of this invention, the oxygenate-containing finished gasoline can be prepared by mixing any desired amount of oxygenate with the xBOB. For example, the oxygenate-containing finished gasoline can contain 1%, 10%, 50%, 99% or any other desired amount of oxygenate. However, it will be appreciated that the invention will typically be most useful in manufacturing oxygenate-containing finished gasoline for distribution to motorists.

To prepare the calibration model useful in this invention for the prediction of properties of an oxygenate-containing finished gasoline having desired specifications from spectroscopic data, one or more xBOB streams can be collected. The xBOB stream can be obtained from any source, but exemplary sources include, but are not limited to, commercial or non-commercial streams, such as refinery streams or laboratory-generated streams. Preferably, the xBOB stream(s) is collected from a refinery. Conventional blendstocks which can be used in the manufacture of an xBOB in accordance with the invention include, but are not limited to, catalytically cracked naphtha, coker naphtha, reformate, virgin naphtha, isomerate, alkylate, raffinate, natural gasoline, polymer gasoline, pyrolysis gasoline, pentane, butane, xylene, toluene, and the like, and mixtures thereof. However, it should be noted that blendstock nomenclature varies from refinery to refinery, and the names listed here are only exemplary in that other names can be used for identical or similar blendstocks.

The xBOB stream then can be analyzed by one or more spectroscopic methods to produce one or more analyzed xBOB product spectrum/spectra. Any type of spectroscopic analysis can be used and exemplary spectroscopic analyses methods are selected from the group consisting of Raman spectroscopy, nuclear magnetic resonance spectroscopy, infrared (IR) spectroscopy, such as, for example, near IR, medium IR, and one or more thereof. Preferably, for ease of use, near infrared spectroscopy is the preferred spectroscopic analytical method. The acquired spectra are performed at the wavelength, wavelengths, or wavelength range of interest and the spectrum can be at one or more wavelengths. The spectrum of the analyzed xBOB stream then is transmitted to a conversion device to mathematically process to correct or enhance the spectrum to create and store one or more corrected spectrum/spectra. Exemplary mathematical processing includes, but is not limited to, first derivative, second derivative, baseline correction, no correction, and combinations of two or more thereof.

The analyzed xBOB stream then is combined, or mixed, with a fixed, known quantity of a pre-determined oxygenate composition to produce an associated oxygenate-containing finished gasoline. Laboratory analyses are performed on this associated oxygenate-containing finished gasoline to determine one or more physical properties. These properties can include, but are not limited to, one or more of research octane, motor octane, distillation properties (such as T10, T20, T50, T90), and also properties such as evaporated volume percent (E200, E300), olefin content, paraffins content, aromatics content, and benzene content. The results of these laboratory analyses, "laboratory results," are paired with and saved with the associated corrected spectra analyses from the xBOB streams. Preferably, 20. xBOB samples associated with the oxygenate-finished gasoline are collected, more preferably 100. runs. Most preferably, for best mathematical correlation, 200, or even more, xBOB samples associated with the oxygenate-finished gasoline are collected.

Then, a mathematical model is created using standard modeling methods to correlate the corrected spectra for a series of xBOB steams to the laboratory results for the associated oxygenate-containing finished gasoline products. Any type of mathematical modeling equations or programs can be used. Exemplary modeling programs include, but are not limited to, chemometric methods such as partial least squares (PLS), multiple linear regression (MLR), principle component regression (PCR), multivariate regression analyses, multivariate statistical analyses, and combinations of two or more thereof. Application of these modeling programs, can be used to correlate the xBOB spectra with the desired properties of the oxygenate-containing finished gasoline such that, the model property prediction will, in the long run, and under normal and correct operation of the test methods, be at least statistically equivalent to the results of a different operator working in a different laboratory testing identical material. Alternatively, application of these modeling programs can be used to correlate the xBOB spectra with the desired properties of the oxygenate-containing finished gasoline such that, the model property prediction will be within six (6) standard deviation units at 95% of the time, preferably within three (3) standard deviation units, and most preferably within two (2) standard deviation units at 95% of the time for best optimized correlations.

Another embodiment of the invention further comprises the additional step of transmitting the predicted results from the model to a control system, wherein said control system can adjust the ratio of refinery blendstocks that are mixed to produce an xBOB stream that when combined with a fixed, known quantity of a pre-determined oxygenate composition will produce an associated oxygenate-containing finished gasoline.

THEORETICAL EXAMPLE

One embodiment of the present invention is schematically illustrated in FIG. 1. FIG. 1 illustrates mixing a plurality of blendstocks to make an xBOB stream, mixing the xBOB stream with a constant quantity and composition oxygenate to prepare an oxygenate-finished gasoline. With reference to FIG. 1, tanks 2, 4, 6, 8, 10, and 12 contain gasoline blending stocks, such as, for example, reformates, isomerates, alkylates, and others. Each of these blending stocks has its own properties as well as a price and value. For example, reformate and alkylate are both high in octane number (a property of gasoline), but are relatively expensive blending stocks. Each of the tanks has an automatic control valve 14, 16, 18, 20, 22, and 24 which controls the flow of the particular blending stock from the tank into common header 26 and thence delivered to mixing tank, pipeline, or transportation vehicle 28. Mixing tank, pipeline or transportation vehicle 28 contains xBOB. Control valves 14, 16, 18, 20, 22, and 24 also can be a proportioning pump. Tanks 2, 4, 6, 8, 10, and 12 and control valves 14, 16, 18, 20, 22, and 24 are merely exemplary of a blending system; there can be more or less tanks and control valves. Pump 30 if needed, can be used to move the blended gasoline through "on-line" analyzer 32 which obtains spectroscopic measurements of side-stream 40 at the wavelength, wavelengths, wavelength range of interest. The spectroscopic measurements, or signals, from analyzer 32 are transmitted to mathematical conversion device 34 which mathematically preprocesses the spectroscopic measurements or signals. Preprocessing examples include, but are not limited to, first derivative, second derivative, baseline correction, no processing, and others. The mathematical model, described above, is applied to the preprocessed signal for the xBOB product delivered to mixing tank, pipeline, or transportation vehicle 28 to predict the properties of the oxygenate-containing finished gasoline. The predicted results of the oxygenate-containing finished gasoline are fed to control system 36 which manages closed-loop control of the blending process. Optional display device 38 can display both the target properties and the measured properties at all times. The output from control system 34 is fed to each control valve 14, 16, 18, 20, 22, and 24, and can control the relative flow of each of the gasoline blending components 2, 4, 6, 8, 10, and 12 into blending tank, pipeline, or transportation vehicle 28. Various adjustments can be made for hold-up in the tank, line fill, etc. Alternately, the functions of the mathematical conversion device 34 can also be performed by control system 36. The resulting gasoline can be controlled to target property limits within a specified tolerance.

In a variation, an operator can read the control system 34 output of gasoline properties on display device 38 and manually or mechanically control and optimize the blending process.

Numerical Ranges

The present description uses numerical ranges to quantify certain parameters relating to the invention. It should be understood that when numerical ranges are provided, such ranges are to be construed as providing literal support for claim limitations that only recite the lower value of the range as well as claims limitation that only recite the upper value of the range. For example, a disclosed numerical range of 10 to 100 provides literal support for a claim reciting "greater than 10" (with no upper bounds) and a claim reciting "less than 100" (with no lower bounds).

Definitions

As used herein, the terms "comprising," "comprises," and "comprise" are open-ended transition terms used to transition from a subject recited before the term to one or more elements recited after the term, where the element or elements listed after the transition term are not necessarily the only elements that make up the subject.

As used herein, the terms "including," "includes," and "include" have the same open-ended meaning as "comprising," "comprises," and "comprise."

As used herein, the terms "having," "has," and "have" have the same open-ended meaning as "comprising," "comprises," and "comprise."

As used herein, the terms "containing," "contains," and "contain" have the same open-ended meaning as "comprising," "comprises," and "comprise."

As used herein, the terms "a," "an," "the," and "said" mean one or more.

As used herein, the term "and/or," when used in a list of two or more items, means that any one of the listed items can be employed by itself or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

Claims Not Limited To The Disclosed Embodiments

The preferred forms of the invention described above are to be used as illustration only, and should not be used in a limiting sense to interpret the scope of the present invention. Obvious modifications to the exemplary embodiments, set forth above, could be readily made by those skilled in the art without departing from the spirit of the present invention.

The inventors hereby state their intent to rely on the Doctrine of Equivalents to determine and assess the reasonably fair scope of the present invention as pertains to any apparatus not materially departing from but outside the literal scope of the invention as set forth in the following claims.

That which is claimed is:

1. A method to make a calibration model comprising:

(a) collecting an xBOB stream sample;

(b) analyzing the xBOB stream sample by one or more spectroscopic methods to produce an analyzed xBOB product spectrum;

(c) transmitting the spectrum of the analyzed xBOB product to a conversion device to mathematically correct or enhance the spectrum to create a corrected spectrum;

(d) adding a fixed, known quantity of a pre-determined oxygenate composition to said analyzed xBOB product to produce an associated oxygenate-containing gasoline;

(e) performing laboratory tests on said associated oxygenate-containing gasoline to determine laboratory results for one or more chemical or physical properties; and (f) correlating the spectra from a series of xBOB streams to the laboratory results for the associated oxygenate-containing gasoline products to produce a calibration model.

2. A method in accordance with claim 1 wherein said xBOB comprises mixtures of hydrocarbons selected form the group consisting of catalytically cracked naphtha, coker naphtha, reformate, virgin naphtha, isomerate, alkylate, raffinate, natural gasoline, polymer gasoline, pyrolysis gasoline, pentane, butane, xylene, toluene, and the like and mixtures thereof.

3. A method in accordance with claim 1 wherein spectroscopic methods are selected from the group consisting of nuclear magnetic resonance spectroscopy, Raman spectroscopy, infrared (IR) spectroscopy, and one or more thereof.

4. A method in accordance with claim 1 wherein said spectroscopic method is near infrared spectroscopy.

5. A method in accordance with claim 1 wherein said oxygenate is a monohydric aliphatic alcohol having from about one to about 10carbon atoms per molecule.

6. A method in accordance with claim 1 wherein said monohydric oxygenate is selected from the group consisting of methanol, ethanol, 1-propanol, 2-propanol, 1-butanol, 2-butanol, 2-methyl-1-propanol, 2-methyl-2-propanol, 1-pentanol, 2-pentanol, 2-methyl-1-butanol, 3-methyl-1-butanol, 2-methyl-2-butanol, 3-methyl-2-butanol and mixtures of two or more thereof.

7. A method in accordance with claim 1 wherein said oxygenate is selected from the group consisting of methanol and ethanol.

8. A method in accordance with claim 1 wherein said physical properties are selected from the group consisting of research octane, motor octane, T10 distillation, T20 distillation, T50 distillation, T90 distillation, final boiling point, E200, E300, olefin content, paraffins content, aromatics content, and benzene content.

9. A method in accordance with claim 1 wherein said correlation process is a chemometric method selected from the group consisting of partial least squares (PLS), multiple linear regression (MLR), principle component regression (PCR), multivariate regression analyses, and multivariate statistical analyses.

10. A method in accordance with claim 1 wherein at least 20 series of xBOB streams and oxygenate-gasoline streams are used.

* * * * *